(12) United States Patent
Beck et al.

(10) Patent No.: US 11,574,014 B2
(45) Date of Patent: Feb. 7, 2023

(54) METHOD AND SYSTEM FOR PREDICATIVE QANDA AND RESOURCE SUGGESTIONS

(71) Applicant: CareerAmerica, LLC, Boulder, CO (US)

(72) Inventors: Benjamin Beck, Pleasant Hill, CA (US); Kevin O'Shea, Evanston, IL (US); Timothy Kuminecz, Buffalo, NY (US)

(73) Assignee: CareerAmerica LLC, Boulder, CO (US)

( * ) Notice: Subject to any disclaimer, the term of this patent is extended or adjusted under 35 U.S.C. 154(b) by 0 days.

(21) Appl. No.: 17/472,185

(22) Filed: Sep. 10, 2021

(65) Prior Publication Data
US 2022/0035869 A1    Feb. 3, 2022

Related U.S. Application Data

(63) Continuation of application No. 16/888,680, filed on May 30, 2020, now Pat. No. 11,151,195.

(51) Int. Cl.
| | |
|---|---|
| *G06F 16/9032* | (2019.01) |
| *G06F 16/9038* | (2019.01) |
| *G06F 3/0482* | (2013.01) |
| *H04L 51/02* | (2022.01) |
| *H04L 51/08* | (2022.01) |
| *G06F 16/735* | (2019.01) |

(52) U.S. Cl.
CPC ...... *G06F 16/90328* (2019.01); *G06F 3/0482* (2013.01); *G06F 16/735* (2019.01); *G06F 16/9038* (2019.01); *G06F 16/90332* (2019.01); *H04L 51/02* (2013.01); *H04L 51/08* (2013.01)

(58) Field of Classification Search
CPC .......... G06F 16/90328; G06F 16/9038; G06F 16/90332; G06F 16/735; G06F 3/0482; H04L 51/02; H04L 51/08
USPC ........................................................ 707/722
See application file for complete search history.

(56) References Cited

U.S. PATENT DOCUMENTS

| | | | |
|---|---|---|---|
| 9,042,540 | B2 | 5/2015 | Tuchman et al. |
| 9,178,994 | B2 | 11/2015 | Tuchman et al. |
| 9,213,748 | B1 | 12/2015 | Matias et al. |
| 9,639,625 | B1 | 5/2017 | Bastide et al. |
| 9,983,788 | B2 | 5/2018 | Laubach |
| 11,151,195 | B1 * | 10/2021 | Beck ................ H04L 51/02 |
| 2012/0076283 | A1 | 3/2012 | Ajmera et al. |
| 2017/0308587 | A1 | 10/2017 | Nagel et al. |
| 2018/0083894 | A1 | 3/2018 | Fung et al. |
| 2018/0083898 | A1 | 3/2018 | Pham |

(Continued)

*Primary Examiner* — William D Titcomb
(74) *Attorney, Agent, or Firm* — Steptoe & Johnson LLP

(57) ABSTRACT

Methods, systems, and computer-readable media provide a real-time Q&A interface, such as an online chatbot, either standing alone or as a live agent assistant, with predicative Q&A and resource suggestions. In one embodiment, the real-time Q&A interface uses data extracted from a user inquiry to identify and display a primary response, identify suggested inquiries from a knowledgebase and provide a user-selectable suggested inquiries indicator, and identify suggested content items from related content libraries or webpages and provide user-selectable suggested content item indicators. In one embodiment, the suggested content items include related videos and links to webpages with related content.

20 Claims, 7 Drawing Sheets

(56) References Cited

U.S. PATENT DOCUMENTS

| | | |
|---|---|---|
| 2018/0083901 A1 | 3/2018 | McGregor, Jr. et al. |
| 2018/0246983 A1 | 8/2018 | Rathod |
| 2018/0367483 A1 | 12/2018 | Rodriguez et al. |
| 2018/0367484 A1 | 12/2018 | Rodriguez et al. |
| 2020/0272820 A1 | 8/2020 | Lim et al. |
| 2020/0374243 A1 | 11/2020 | Jina et al. |

* cited by examiner

METHOD AND SYSTEM FOR PREDICATIVE QANDA AND RESOURCE SUGGESTIONS

CROSS-REFERENCE TO RELATED APPLICATIONS

This application is a continuation of and claims priority to U.S. application Ser. No. 16/888,680, filed May 30, 2020, which is hereby incorporated by reference in its entirety.

FIELD OF THE INVENTION

The present invention relates to an improved method and system for identifying and providing predicative questions and suggested content through a real-time Q&A ("question-and-answer") or chat interface, such as an online chatbot, either standing alone or as a live agent assistant.

BACKGROUND OF THE INVENTION

Existing chatbots do not provide features and resources for efficiently initiating and leading real-time conversations and for efficiently guiding users to relevant targeted content such as related videos, links, and follow-up questions in a Q&A or chat interface. Existing chatbots and live agent assistants require a user to independently come up with questions and guide the conversation with the chatbot. Obtaining relevant targeted information using an existing chatbot is dependent upon a user's unassisted ability to formulate the correct inquiries. Existing chatbots are also limited by the type and scope of information or content that can be identified and provided to a user. Existing chatbots also fail to present multiple different types of relevant information and content to a user in an efficient way that avoids information overload.

SUMMARY

The method and system of the present invention provides a more effective and efficient way of guiding a user's search, identifying relevant and targeted information, and providing a user with relevant and targeted information during a Q&A session. For example, the method and system of the present invention provide an improved way for a real-time chatbot to efficiently guide a Q&A session with a user. Also, for example, the method and system of the present invention provide an improved and more efficient way for searching, identifying, and presenting relevant targeted content of multiple different types to a user in a real-time Q&A interface environment without requiring the use of a separate, broader non-Q&A search engine and without causing information overload. While existing chatbot interfaces diminish a user's experience by inefficiently requiring a user with limited understanding to lead Q&A and to utilize external resources outside of the chatbot Q&A interface to search, identify, and access relevant information and content, the present invention provides predicative Q&A and access to relevant resources within the Q&A interface for an efficient user-friendly interaction. Implementations of the present invention make information easier to find and access on computing devices. The methods and systems of the present invention improve the operation of Q&A interfaces and the computer systems and devices that provide Q&A sessions. The specific improvements of the present invention provide a more efficient and comprehensive real-time Q&A interface.

In one embodiment, a method for providing a Q&A interface is provided. The method can comprise providing a communication interface, which can comprise an input field. The method can also comprise receiving an entry, for example, through the input field and by a user. The method can also comprise processing the entry, which can produce an extracted data associated with the entry.

The method can also comprise identifying a response to the entry, and the response can be identified based on a correlation between the extracted data associated with the entry and a property of the response. The method can also comprise identifying a suggested inquiry, and the suggested inquiry can be identified based on a correlation between the extracted data associated with the entry and a property of the suggested inquiry. The suggested inquiry can be selected, for example, from a set of possible suggested inquiries. The method can also comprise identifying a suggested content item, and the suggested content item can be identified based on a correlation between the extracted data associated with the entry and a property of the suggested content item. The suggested content item can be selected, for example, from a set of possible suggested content items. The method can also comprise identifying a suggested link, which can be associated with a suggested link item, and the suggested link can be identified based on a correlation between the extracted data associated with the entry and a property of the suggested link item.

The method can also comprise displaying the response in the communication interface. The method can also comprise displaying a suggested inquiries indicator in the communication interface. The suggested inquiries indicator, for example, can be associated with the suggested inquiry, and the communication interface can be configured to display the suggested inquiry upon a user's selection of the suggested inquiries indicator. The method can also comprise displaying a suggested content item indicator in the communication interface. The suggested content item indicator, for example, can be associated with the suggested content item, and the communication interface can be configured to display the suggested content item upon a user's selection of the suggested content item indicator. The method can also comprise displaying a suggested link indicator in the communication interface. The suggested link indicator, for example, can be associated with the suggested link, and the communication interface can be configured to display the suggested link upon a user's selection of the suggested link indicator.

In one embodiment, a method for providing a Q&A interface is provided wherein processing an entry, identifying and displaying a response, identifying a suggested inquiry, identifying a suggested content item, identifying a suggested link, displaying a suggested inquiries indicator, displaying a suggested content item indicator, and/or displaying a suggested link indicator are performed as real-time steps following receiving an entry. Such real-time steps, for example, can be performed by a chatbot.

In one embodiment, a method for providing a Q&A interface can comprise receiving a second entry, for example, through the input field, by a user, and after performance of the real-time steps described herein. The method can also comprise processing the second entry, which can produce a second extracted data associated with the second entry.

The method can also comprise identifying a second response to the second entry, and the second response can be identified based on a correlation between the second extracted data associated with the second entry and a property of the second response. The method can also comprise identifying a second suggested inquiry, and the second suggested inquiry can be identified based on a correlation between the second extracted data associated with the second entry and a property of the second suggested inquiry. The second suggested inquiry can be selected, for example, from a set of possible suggested inquiries, including the set from which a first suggested inquiry was selected. The method can also comprise identifying a second suggested content item, and the second suggested content item can be identified based on a correlation between the second extracted data associated with the second entry and a property of the second suggested content item. The second suggested content item can be selected, for example, from a set of possible suggested content items, including the set from which a first suggested content item was selected. The method can also comprise identifying a second suggested link, which can be associated with a second suggested link item, and the second suggested link can be identified based on a correlation between the second extracted data associated with the second entry and a property of the second suggested link item.

The method can also comprise displaying the second response in the communication interface. The method can also comprise associating a suggested inquiries indicator with the second suggested inquiry, and the communication interface can be configured to display the second suggested inquiry upon a user's selection of the suggested inquiries indicator. The method can also comprise associating a suggested content item indicator with the second suggested content item, and the communication interface can be configured to display the second suggested content item upon a user's selection of the suggested content item indicator. The method can also comprise associating a suggested link indicator with the second suggested link, and the communication interface can be configured to display the second suggested link upon a user's selection of the suggested link indicator. In one embodiment, processing a second entry, identifying and displaying a second response, identifying a second suggested inquiry, identifying a second suggested content item, identifying a second suggested link, associating a suggested inquiries indicator with the second suggested inquiry, associating a suggested content item indicator with the second suggested content item, and/or associating a suggested link indicator with the second suggested content item are performed as real-time steps following receiving a second entry. Such real-time steps, for example, can be performed by a chatbot.

In one embodiment, a method for providing a Q&A interface can comprise receiving a selection of a suggested inquiry, for example, by a user and after performance of the real-time steps described herein. The method can also comprise processing the suggested inquiry, which can produce a second extracted data associated with the suggested inquiry.

The method can also comprise identifying a second response to the suggested inquiry, and the second response can be identified based on a correlation between the second extracted data associated with the suggested inquiry and a property of the second response. The method can also comprise identifying a second suggested inquiry, and the second suggested inquiry can be identified based on a correlation between the second extracted data associated with the suggested inquiry and a property of the second suggested inquiry. The second suggested inquiry can be selected, for example, from a set of possible suggested inquiries, including the set from which a first suggested inquiry was selected. The method can also comprise identifying a second suggested content item, and the second suggested content item can be identified based on a correlation between the second extracted data associated with the suggested inquiry and a property of the second suggested content item. The second suggested content item can be selected, for example, from a set of possible suggested content items, including the set from which a first suggested content item was selected. The method can also comprise identifying a second suggested link, which can be associated with a second suggested link item, and the second suggested link can be identified based on a correlation between the second extracted data associated with the suggested inquiry and a property of the second suggested link item.

The method can also comprise displaying the second response in the communication interface. The method can also comprise associating a suggested inquiries indicator with the second suggested inquiry, and the communication interface can be configured to display the second suggested inquiry upon a user's selection of the suggested inquiries indicator. The method can also comprise associating a suggested content item indicator with the second suggested content item, and the communication interface can be configured to display the second suggested content item upon a user's selection of the suggested content item indicator. The method can also comprise associating a suggested link indicator with the second suggested link, and the communication interface can be configured to display the second suggested link upon a user's selection of the suggested link indicator. In one embodiment, processing a suggested inquiry, identifying and displaying a second response, identifying a second suggested inquiry, identifying a second suggested content item, identifying a second suggested link, associating a suggested inquiries indicator with the second suggested inquiry, associating a suggested content item indicator with the second suggested content item, and/or associating a suggested link indicator with the second suggested content item are performed as real-time steps following receiving a user's selection of the suggested inquiry. Such real-time steps, for example, can be performed by a chatbot.

In one embodiment of a method for providing a Q&A interface, a suggested content item can be a video and a set of possible suggested content items can be a video library. Also, in one embodiment, an extracted data associated with an entry can comprise named entity recognition data or intent classification data. Also, in one embodiment, a correlation can be based on a keyword, intent, entity, sentiment, or category.

In one embodiment of a method for providing a Q&A interface, a communication interface can comprise a conversation field, which can be configured to display an entry and a response. In one embodiment, a communication interface can comprise a suggested content display area, which can be configured to display a suggested inquiry upon selection of a suggested inquiries indicator, a suggested content item upon selection of a suggested content item indicator, and/or a suggested link or suggested link item upon selection of a suggested link indicator. In one embodiment, a method for providing a Q&A interface comprises receiving a user's selection of a suggested inquiry, a suggested content item, or a suggested link.

In one embodiment, a non-transitory computer-readable medium is provided with instructions thereon that, when executed by a computing system, perform a method comprising providing a communication interface, which can comprise an input field. The method can also comprise receiving an entry, for example, through the input field and by a user. The method can also comprise processing the entry, which can produce an extracted data associated with the entry.

The method performed by executing the instructions of a non-transitory computer-readable medium can also comprise identifying a response to the entry, and the response can be identified based on a correlation between the extracted data associated with the entry and a property of the response. The method can also comprise identifying a suggested inquiry, and the suggested inquiry can be identified based on a correlation between the extracted data associated with the entry and a property of the suggested inquiry. The suggested inquiry can be selected, for example, from a set of possible suggested inquiries. The method can also comprise identifying a suggested content item, and the suggested content item can be identified based on a correlation between the extracted data associated with the entry and a property of the suggested content item. The suggested content item can be selected, for example, from a set of possible suggested content items. The method can also comprise identifying a suggested link, which can be associated with a suggested link item, and the suggested link can be identified based on a correlation between the extracted data associated with the entry and a property of the suggested link item.

The method performed by executing the instructions of a non-transitory computer-readable medium can also comprise displaying the response in the communication interface. The method can also comprise displaying a suggested inquiries indicator in the communication interface. The suggested inquiries indicator, for example, can be associated with the suggested inquiry, and the communication interface can be configured to display the suggested inquiry upon a user's selection of the suggested inquiries indicator. The method can also comprise displaying a suggested content item indicator in the communication interface. The suggested content item indicator, for example, can be associated with the suggested content item, and the communication interface can be configured to display the suggested content item upon a user's selection of the suggested content item indicator. The method can also comprise displaying a suggested link indicator in the communication interface. The suggested link indicator, for example, can be associated with the suggested link, and the communication interface can be configured to display the suggested link upon a user's selection of the suggested link indicator.

In one embodiment of a method performed by executing the instructions of a non-transitory computer-readable medium, the steps of processing an entry, identifying and displaying a response, identifying a suggested inquiry, identifying a suggested content item, identifying a suggested link, displaying a suggested inquiries indicator, displaying a suggested content item indicator, and/or displaying a suggested link indicator are performed as real-time steps following receiving an entry. Such real-time steps, for example, can be performed by a chatbot.

In one embodiment of a method performed by executing the instructions of a non-transitory computer-readable medium, a suggested content item can be a video and a set of possible suggested content items can be a video library. Also, in one embodiment, an extracted data associated with an entry can comprise named entity recognition data or intent classification data. Also, in one embodiment, a correlation can be based on a keyword, intent, entity, sentiment, or category.

In one embodiment of a method performed by executing the instructions of a non-transitory computer-readable medium, a communication interface can comprise a conversation field, which can be configured to display an entry and a response. In one embodiment, a communication interface can comprise a suggested content display area, which can be configured to display a suggested inquiry upon selection of a suggested inquiries indicator, a suggested content item upon selection of a suggested content item indicator, and/or a suggested link or suggested link item upon selection of a suggested link indicator. In one embodiment, the method comprises receiving a user's selection of a suggested inquiry, a suggested content item, or a suggested link.

In one embodiment, a system is provided comprising a communication interface, which can be displayed on a website and can be configured to receive a user entry. In one embodiment, the system can comprise a real-time natural language processor, which can be configured to process a user entry, for example, to extract data associated with the user entry. In one embodiment, the system can comprise a suggested inquiries knowledgebase that, for example, comprises a set of possible suggested inquiries.

In one embodiment, the system can comprise a server system, which can be configured to identify a response, for example, based on a correlation between the extracted data and a property of the response. In one embodiment, the server system can be configured to identify a suggested inquiry, for example, based on a correlation between the extracted data and a property of the suggested inquiry, and the suggested inquiry can be selected from the set of possible suggested inquiries. In one embodiment, the server system can be configured to identify a suggested content item, for example, based on a correlation between the extracted data and a property of the suggested content item, and the suggested content item can be selected from a set of possible suggested content items. In one embodiment, the server system can be configured to identify a suggested link, which can be associated with a suggested link item. The suggested link can be identified, for example, based on a correlation between the extracted data and a property of the suggested link item, and the suggested link item can be selected from a set of possible suggested link items.

In one embodiment, the system can comprise a communication interface configured to display the first response, display a suggested inquiries indicator that can be associated with the suggested inquiry, display a suggested content item indicator that can be associated with the suggested content item, and/or display a suggested link indicator that can be associated with the suggested link.

In one embodiment of the system, a suggested content item can be a video and a set of possible suggested content items can be a video library. Also, in one embodiment of the system, an extracted data associated with a user entry can comprise named entity recognition data or intent classification data.

In one embodiment of the system, a communication interface can comprise a conversation field, which can be configured to display an entry and a response. In one embodiment, a communication interface can comprise a suggested content display area, which can be configured to display a suggested inquiry upon selection of a suggested inquiries indicator, a suggested content item upon selection of a suggested content item indicator, and/or a suggested link or suggested link item upon selection of a suggested link indicator. In one embodiment, the system can receive a user's selection of a suggested inquiry, a suggested content item, or a suggested link.

DETAILED DESCRIPTION

Figure 1:
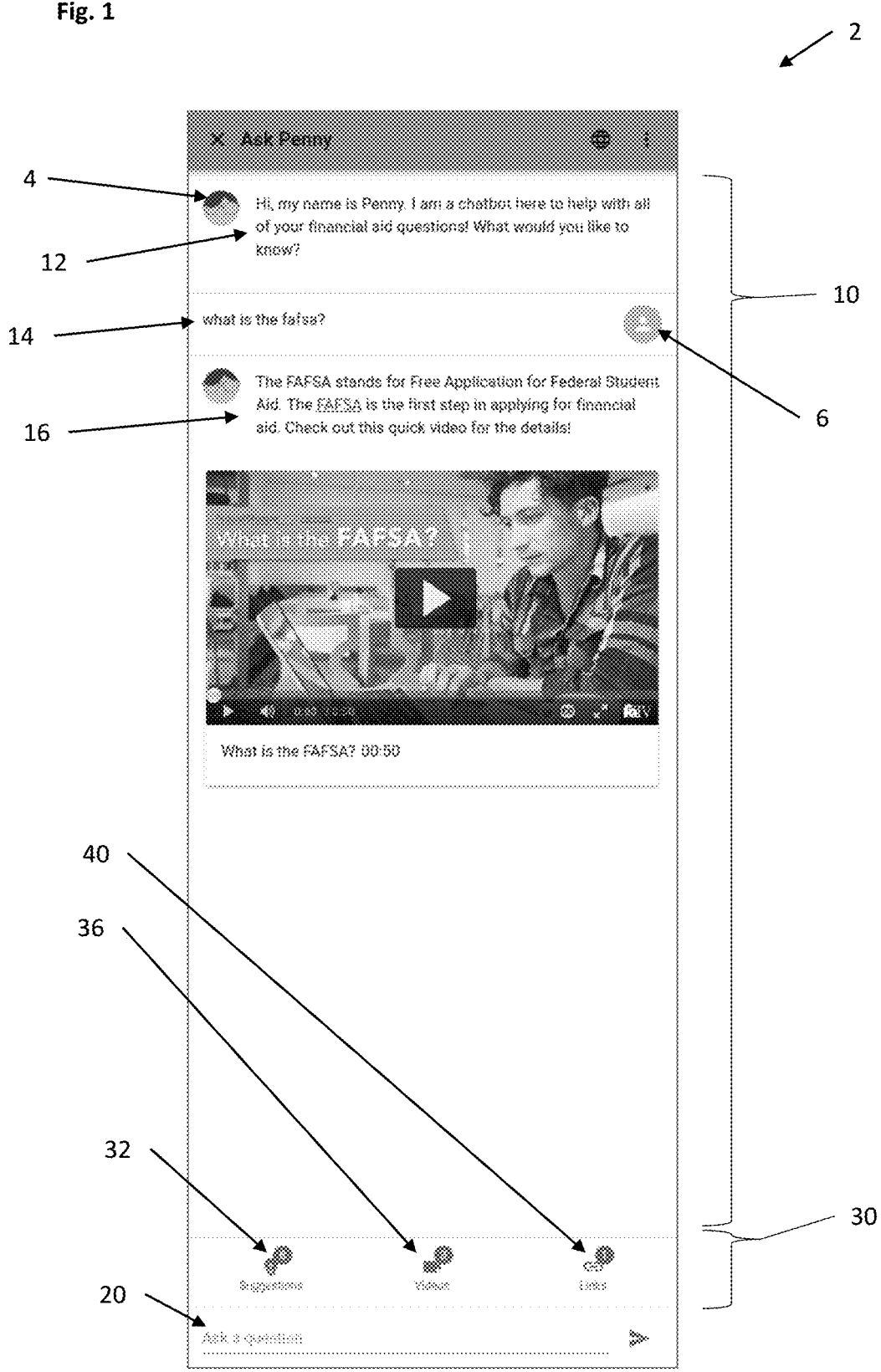
FIGS. 1-4 are screenshots of an exemplary chatbot Q&A interface according to an implementation of the present invention.

The following disclosure provides different embodiments, or examples, for implementing different features of the subject matter. Specific examples of components, features, arrangements, or steps are described below to simplify the present disclosure. These are, of course, merely examples and are not intended to be limiting.

In one embodiment, the invention can comprise a communication interface through which a user communicates with a real-time chatbot or a live agent. The communication interface can be a Q&A interface, for example, that provides a Q&A session between a user and a chatbot or a live agent. Reference to Q&A ("question-and-answer"), such as a Q&A feature, interface, or session, may refer to a chat feature, interface, or chat session. Q&A may involve, for example, interaction or back-and-forth communication between two or more parties or entities, such as one or more entries (e.g., an inquiry) of a first party and one or more replies or reactions of a second party. The communication interface can comprise an input field that allows a user to enter information, such as an inquiry, via text, audio, voice, image(s), or document(s). The input field may allow a user to enter information by selecting from a set of one or more initial suggested inquiries or initial suggested content items.

The invention can comprise a system and method for real-time processing of a user's entry, for example, to extract data from the user's entry. Processing of a user's entry may include preprocessing by a preprocessor. The preprocessor may clean and reorganize an input text string, remove extraneous information (e.g., extra spaces, stop words, sparse terms, non-useful special symbols, etc.), expand abbreviations, and perform correction of errors, such as spelling and grammar errors.

Processing of the user's entry may include natural language processing, intent classification, named entity recognition (NER), sentiment analysis, keyword recognition, or other methods of processing the syntax, semantics, or keywords of a user's entry. Data from a user's processed entry can be one or more keywords, topics, categories, intent classification data such as intents, NER data such as named entities, sentiment analysis data, or other data extracted from the user's entry.

Processing of a user's entry may utilize machine learning. Such machine learning may be based on, for example, the following: an existing knowledgebase; content scraping of one or more relevant content items or sources; one or more of a user's previous entries or interactions; a response to suggested content item identified based on one or more of a user's previous entries; conversations of previous users of the communication interface; or one or more entries, responses, or suggested content items in such conversations. For example, previous activity (e.g., activity of a user(s) and/or the system) may be utilized to train a machine learning model involved with one or more of the functionalities of the system or method (e.g., processing a user entry, identifying a response, or identifying suggested content). For example, previous activity may be used to train a learn-to-rank model involved with providing responses or suggested content. Previous activity may be stored and associated with a particular user(s). Previous activity may be used in updating or customizing aspects of the system or method, such as updating a knowledgebase or library, for example, by an administrator. Processing of a user's entry may be performed by an artificial intelligence platform. Processing of a user's entry may be performed by platforms such as IBM Watson, Amazon Lex, Google Dialogflow, and Microsoft Luis, among others. Processing of a user's entry may be performed by a custom machine-learning solution implemented on a platform such as TensorFlow or Amazon SageMaker.

The communication interface can comprise a conversation field that may display a prompt, one or more user entries (e.g., inquiries), one or more responses to each user entry, and/or features for related or suggested content.

A prompt may be an initial instruction or question posed to a user and may direct the user to enter information into an input field. A prompt may be related to a particular topic, subject, field, industry, resource, entity, website, goods or service provider, company, person, or university. For example, a prompt may state "What would you like to know?" or more specifically "What would you like to know about XYZ University? Please enter your question in the input field below." A prompt may include information regarding one or more suggested inputs. A prompt or suggested input(s) included with the prompt may be selected or customized by an administrator or host. A prompt or suggested input(s) included with the prompt may be based on trending topics or activities, for example, that are trending across a network. A suggested input provided with the prompt may be selectable, such that a user may select for the suggested input to be a user entry as described herein.

A response to an entry (e.g., inquiry) by a user may comprise, for example, an answer, a video or image, a description, a link to a webpage or content related to the user's entry, a question directed to the user, or any combination thereof. More than one response may be provided in reply to a user entry, and a response may comprise more than one content item. A response to a user's entry may be selected from a knowledgebase, such as a knowledgebase of possible responses. A knowledgebase of possible responses may be customizable. In one embodiment, a response may be identified or selected from all forms of indexed content enhanced by machine learning metadata. In one embodiment, a response may be identified or selected from indexed content related to one or more websites, video libraries, databases, topics, subjects, fields, industries, resources, entities, good or service providers, companies, persons, or universities.

A response may be identified based on particular information in a user's entry. For example, a response may be identified based on a correlation, matching, or mapping of data from a user's processed entry to data or properties associated with a possible response. The terms data and property may be used interchangeably herein. Data or properties associated with a possible response may be metadata, a description, a title, a keyword, a source or author, a category, NER data (e.g., NER data processed from text of the possible response), intent classification data (e.g., intent classification data processed from text of the possible response), sentiment analysis data, or other types of data. This correlation may be based, for example, on a keyword, intent, entity, sentiment, or category. For example, a user's entry may be processed to identify NER data and/or intent classification data for the entry, and a knowledgebase of possible responses may be searched to identify a response with data that correlates to the NER data and/or intent classification data of the user's entry.

In one embodiment, the communication interface comprises features related to suggested content. Suggested content, for example, may be videos, images, links to webpages or other content, suggested inquiries, and/or other types of content. Suggested content may be identified based on particular information in a user's present entry or previous activity (e.g., previous entry or previously selected suggested content item) during a present session or previous session. Suggested content may be identified based on a context determined from a user's previous activity during a present session or a previous session. A context for a particular user may be stored or associated with the user by a user profile, user authentication, or database. A suggested content item may not be identified or displayed to a user if the suggested content item was previously displayed to a user or selected by a user. One or more suggested content items may be displayed to a user before a user entry, for example, when the communication interface is first launched. For example, one or more suggested content items may be provided along with the prompt, may relate to a preset or predetermined context, and/or may be based on previous activity. A user's initial entry or input may comprise selection of such an initial suggested content item.

A static or dynamic set of possible suggested videos, images, or similar content—or identifiers, pointers, or links to such content—may be stored or indexed in a library (e.g., video library) or database. The library or database may be customizable. Suggested videos, images, or similar content may be stored, indexed, and/or searched from a certain source(s), such as websites, video libraries, or databases related to or provided by a particular topic, subject, field, industry, resource, entity, goods or service provider, company, person, or university.

References to video herein are not meant to be limiting, as embodiments of the invention can relate to or involve many different types of media content. For example, references to video herein may be substituted or supplemented with any combination of text, audio, images, animations, interactive content, or other content form, for example, for the communication of information.

A suggested video or similar content may be identified or selected based on a correlation, matching, or mapping of data from a user's processed entry to data or properties associated with a suggested video. Data or properties associated with a suggested video may be metadata, a description of the video's content, a title, a keyword, a source or author, a category, NER data (e.g., NER data processed from text associated with the video), intent classification data (e.g., intent classification data processed from text associated with the video), or sentiment analysis data. The correlation may be based, for example, on a keyword, intent, entity, sentiment, or category. For example, a user's entry may be processed to identify NER data and/or intent classification data for the entry, and a video library may be searched to identify one or more suggested videos with data that correlates to the NER data and/or intent classification data of the user's entry.

A suggested link may be to a suggested link item such as a webpage or other content (e.g., document, image, or email). A static or dynamic set of possible suggested links may be stored or indexed in a library or database. The library or database may be customizable. Suggested links may be stored, indexed, searched, and/or pulled from a certain source(s), such as links to websites related to or provided by a particular topic, subject, field, industry, resource, entity, goods or service provider, company, person, or university. Suggested links may be links to webpages that are similar or related to a website on which the communication interface is hosted, embedded, or included.

A suggested link may be identified or selected based on a correlation, matching, or mapping of data from a user's processed entry to data or properties associated with a suggested link. Data or properties associated with a suggested link may be content from a webpage to which the suggested link is directed, information about such content (e.g., metadata, a description, a title, a keyword, a source or author, or a category), information about the webpage, NER data (e.g., NER data processed from text associated with the webpage or content thereof), intent classification data (e.g., intent classification data processed from text associated with the webpage or content thereof), sentiment analysis data, or other information scraped and indexed from the webpage. The correlation may be based, for example, on a keyword, intent, entity, sentiment, or category. For example, a user's entry may be processed to identify NER data and/or intent classification data for the entry, content scraped from webpages associated with the communication interface may be processed to identify NER data and/or intent classification data for the associated webpages, and one or more suggested links may be identified by searching the NER data and/or intent classification data of the associated webpages for the NER data and/or intent classification data of the user's entry (e.g., using a weighted keyword search).

A static or dynamic set of possible suggested inquiries may be stored or indexed in a knowledgebase. A knowledgebase of possible suggested inquiries may be customizable. Suggested inquiries may be related to a particular website, topic, subject, field, industry, resource, entity, goods or service provider, company, person, or university.

A suggested inquiry may be identified or selected based on a correlation, matching, or mapping of data from a user's processed entry to data or properties associated with a suggested inquiry. Data or properties associated with a suggested inquiry may be a keyword, a category, NER data (e.g., NER data processed from text of the suggested inquiry), intent classification data (e.g., intent classification data processed from text of the suggested inquiry), or sentiment analysis data. The correlation may be based, for example, on a keyword, intent, entity, sentiment, or category. For example, a user's entry may be processed to identify NER data and/or intent classification data for the entry, and a knowledgebase containing possible suggested inquiries may be searched to identify one or more suggested inquiries with NER data and/or intent classification data that matches or correlates to the NER data and/or intent classification data of the user's entry.

Suggested content and/or suggested content indicators can be displayed, for example, in the communication interface, such as in or proximate to a conversation field, an input field, or one or more suggested content areas. A suggested content area can be a set area, moveable area, drop-down or collapsible area, or pop-out area.

A suggested content area can be a suggested content display area, for example, that displays suggested content such as suggested inquiries, suggested videos, and/or suggested links. Different types of suggested content (e.g., suggested inquires, videos, and links) can be displayed at the same time in a single suggested content display area, at different times in the same suggested content display area, or in different suggested content display areas.

A suggested content area can be a suggested content indicator area, for example, that displays one or more suggested content indicators, content descriptors, icons, notification symbols, or notification quantity values. For example, a communication interface can include a suggested content indicator area, proximate to the input field, that includes a suggested content indicator for suggested inquiries, suggested videos, and/or suggested links.

A suggested inquiries indicator may include, for example, an icon or image related to or symbolizing inquiries, a descriptor (e.g., "suggestions" or "suggested questions"), and a notification symbol with a notification quantity that notifies a user that a chatbot has identified a given number of suggested inquiries related to the user's entry. A suggested videos indicator may include, for example, an icon or image related to or symbolizing videos, a descriptor (e.g., "videos" or "suggested videos"), and a notification symbol with a notification quantity that notifies a user that a chatbot has identified a given number of suggested videos related to the user's entry. A suggested links indicator may include, for example, an icon or image related to or symbolizing links or websites, a descriptor (e.g., "links" or "suggested links"), and a notification symbol with a notification quantity that notifies a user that a chatbot has identified a given number of suggested links to websites related to the user's entry.

Suggested content and/or a suggested content area may be hidden or displayed based on a user selection. A user selection, for example, may include clicking, touching, or hovering a pointer over a particular item or area displayed on a graphical user interface. For example, a user may select to expand, collapse, or scroll the communication interface or areas thereof, such as a conversation field, input field, or suggested content field. The size, position, or layout of the communication interface or areas thereof may be customizable. The size, position, or layout of the communication interface or areas thereof may be automatically altered or rearranged upon a user entering an entry in an input field, upon a user selecting or scrolling an area in the communication interface, upon a user selecting a suggested content indicator, or upon some other user selection or setting.

In one embodiment, a suggested content area and/or suggested content is initially hidden and then expanded for display to a user upon the user's selection. For example, the user may select a suggested content indicator to display suggested content and/or a suggested content display area associated with the suggested content indicator. In one embodiment, a user may select a suggested inquiries indicator, suggested videos indicator, or suggested links indicator to display suggested inquiries, suggested videos, or suggested links, respectively.

In one embodiment, when a user selects a suggested inquiry, the selected suggested inquiry is received and processed (e.g., processed by a chatbot) similar to how a user's entry in an input field is received and processed. For example, upon a user's selection of a suggested inquiry, the selected suggested inquiry can be displayed in a conversation field, a response to the selected suggested inquiry can be identified and displayed, suggested content (e.g., suggested inquiries, suggested videos, and suggested links that relate to the selected suggested inquiry) can be identified, and suggested content or associated suggested content indicators can be displayed.

In one embodiment, when a user selects a suggested video, the selected suggested video is displayed and/or played in the communication interface (e.g., in a conversation field or a suggested content display area). In one embodiment, a selected suggested video can be displayed and/or played outside of the communication interface, such as on a separate webpage, in a separate browser tab, in a separate browser, or on a website on which the communication interface is hosted or embedded. The communication interface may stay open or may be hidden or closed when a suggested video is selected or played.

In one embodiment, when a user selects a suggested link, a website or other content associated with the selected suggested link is displayed in the communication interface (e.g., in a conversation field or a suggested content display area). In one embodiment, a website or other content associated with a selected suggested link can be displayed outside of the communication interface, such as on or as a separate webpage, on or as a separate browser tab, in a separate browser, or as a website on which the communication interface is hosted or embedded. For example, a selected suggested link may be a link to a webpage of the same domain on which the communication interface is offered, and the communication interface may stay open when a suggested link is selected and opened. For example, a selected suggested link may be a link to an external webpage not on the same domain on which the communication interface is offered, and when the suggested link is selected, the user is directed to the external webpage.

FIG. 1 is a screenshot of an example chatbot interface 2 with the title "Ask Penny." The chatbot interface 2 that can be hosted or embedded on a website, such as a university's financial aid website. The chatbot interface 2 comprises a conversation field 10. Upon initiating or opening the chatbot interface 2, a prompt 12 is displayed to the user in the conversation field 10. In this example, the prompt 12 presents the user with a question: "What would you like to know?" The chatbot interface 2 comprises an input field 20 in which a user can enter inquiries, such as the first inquiry 14. In this example, the input field 20 includes an instruction that instructs the user to "Ask a question," and the first inquiry 14 entered by the user asks: "what is the fafsa?" Inquiries entered in the input field 20, such as first inquiry 14, are then displayed in the conversation field 10.

The chatbot interface 2 is powered by chatbot back-end (not shown) that performs real-time processing of, and provides real-time responses to, a user's inquiries, such as first inquiry 14. In response to each user inquiry, such as first inquiry 14, the chatbot back-end (not shown) performs real-time processing of the inquiry to extract intent classification data and NER data, uses the data extracted from a processed inquiry to determine a real-time response to the inquiry, and performs real-time display of the response in the conversation field 10. For example, in response to the first inquiry 14 entered by the user, the chatbot interface 2 displays the first primary response 16 in the conversation field 10 with no noticeable delay (i.e., the chatbot interface 2 provides a real-time response). The first primary response 16 comprises a textual answer ("The FAFSA stands for . . . ") and a video (titled "What is the FAFSA?").

The prompt 12 and responses displayed in the conversation field 10, such as the first primary response 16, are displayed with the chatbot responder icon 4. A user's entries and selections, such as the first inquiry 14, are displayed in the conversation field 10 with a user icon 6.

The chatbot interface 2 further comprises a suggested content indicator area 30 proximate to the input field 20. The suggested content indicator area 30 includes a suggested inquiries indicator 32, a suggested videos indicator 36, and a suggested links indicator 40. The suggested inquiries indicator 32 comprises a descriptor ("Suggestions"), an icon related to inquiries, and a notification symbol that is in the shape of a circle at the top right of the suggested inquiries indicator 32 and shows a notification quantity ("8"). The suggested videos indicator 36 and suggested links indicator 38 also each comprise a descriptor ("Videos" and "Links," respectively), an icon, and a notification symbol with a notification quantity ("3" and "1," respectively) similar to the suggested inquiries indicator 32.

In response to each user inquiry, such as first inquiry 14, the chatbot back-end (not shown) uses data extracted from a processed inquiry, such as NER data and intent classification data, to perform real-time identification of suggested inquiries, suggested videos, and suggested links related to the user's inquiry.

When a suggested inquiry, suggested video, or suggested link is identified for a given inquiry, the suggested inquiries indicator 32, suggested videos indicator 36, or suggested links indicator 40, respectively, includes a notification symbol with a notification quantity to indicate that such suggested content has been identified and to indicate the number of suggested content items identified for each type of suggested content. For example, in response to the first inquiry 14 entered by the user: the notification symbol/quantity of the suggested inquiries indicator 32 indicates that eight suggested inquiries related to the first inquiry 14 have been identified; the notification symbol/quantity of the suggested videos indicator 36 indicates that three suggested videos related to the first inquiry 14 have been identified; the notification symbol/quantity of the suggested links indicator 40 indicates that 1 suggested link related to the first inquiry 14 has been identified.

Figure 2:
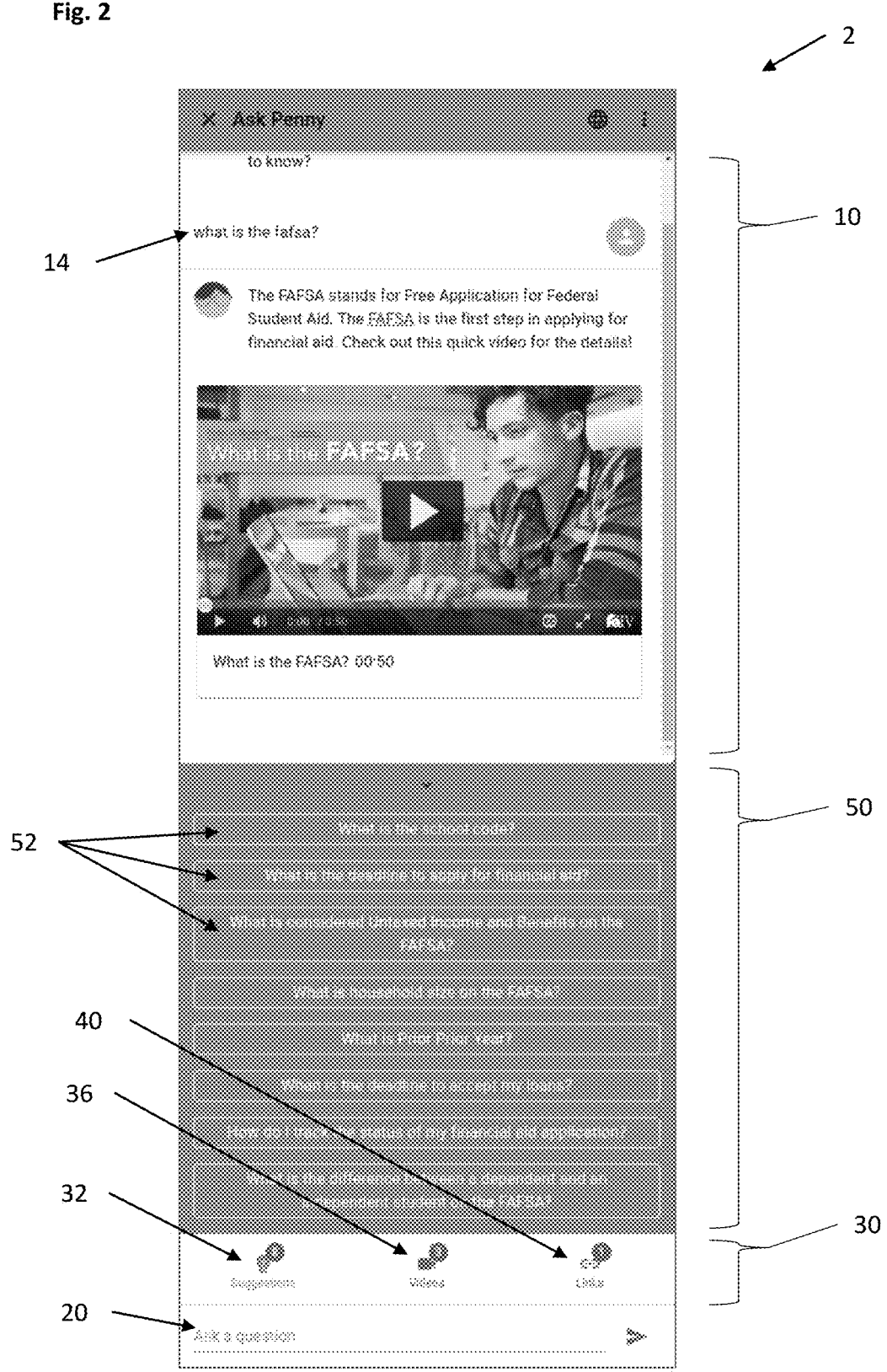

FIG. 2 is another screenshot of the example chatbot interface 2. A user may select or click the suggested inquiries indicator 32, suggested videos indicator 36, or suggested links indicator 40 of the chatbot interface 2. When a user selects one of indicators 32, 36, 40, a suggested content display area 50 is displayed in the chatbot interface 2 proximate to the suggested content indicator area 30. The suggested content display area 50 and the conversation field 10 can each be independently scrollable by the user, as necessary. The suggested content display area 50 may be a drop-down area. A user may display or expand the suggested content display area 50 by selecting any one of indicators 32, 36, 40. A user may hide, collapse, or minimize the suggested content display area 50, for example, by selecting the same indicator 32, 36, 40 that was selected to display or expand the suggested content display area 50 or by selecting the input field 20.

The suggested content display area 50 displays suggested content of the type associated with the suggested content indicator 32, 36, 40 selected by the user. For example, FIG. 2 shows the chatbot interface 2 when a user has selected the suggested inquiries indicator 32 to display/expand the suggested content display area 50 and display suggested inquiry items 52 in the suggested content display area 50. If a user selects the suggested videos indicator 36 or suggested links indicator 40, the suggested content display area 50 will display suggested videos or suggested links, respectively.

As shown in FIG. 2, the suggested inquiries 52 (e.g., "What is the deadline to apply for financial aid?") relate to the user's first inquiry 14 (i.e., "what is the fafsa?"). The suggested inquiries 52 may be identified by the chatbot backend (not shown), using real-time identification, from a database of possible inquiries based on NER data and/or intent classification data extracted from a user's inquiry.

A user may select or click one of the suggested inquiries 52 displayed in the suggested content display area 50. When a user selects a suggested inquiry 52, the selected suggested inquiry 52 is processed and displayed similar to how an inquiry entered by a user in the input field 20 is processed and displayed. That is, when a user selects a suggested inquiry 52, the following real-time steps are performed with no noticeable delay: the chatbot backend (not shown) processes the selected suggested inquiry 52 to extract intent classification data and NER data; the chatbot backend uses the data extracted from the selected suggested inquiry 52 to determine a response to the selected suggested inquiry 52; the conversation field 10 displays the selected suggested inquiry 52 and the response thereto; the chatbot back-end uses data extracted from a selected suggested inquiry 52 to identify suggested inquiries, suggested videos, and suggested links related to the selected suggested inquiry 52; the indicators 32, 36, 40 are updated as needed to indicate any suggested inquiries, suggested videos, and suggested links identified for the selected suggested inquiry 52. For each new inquiry entered by a user in the input field 20 or selected from suggested inquiries 52 displayed in the suggested content display area 50, the new inquiry is processed, the chatbot interface 2 displays a response to the new inquiry, the suggested content indicators 32, 36, 40 indicate whether suggested content related to the new inquiry has been identified and allows a user to select one of the indicators 32, 36, 40 to display the associated suggested content related to the new inquiry.

Figure 3:
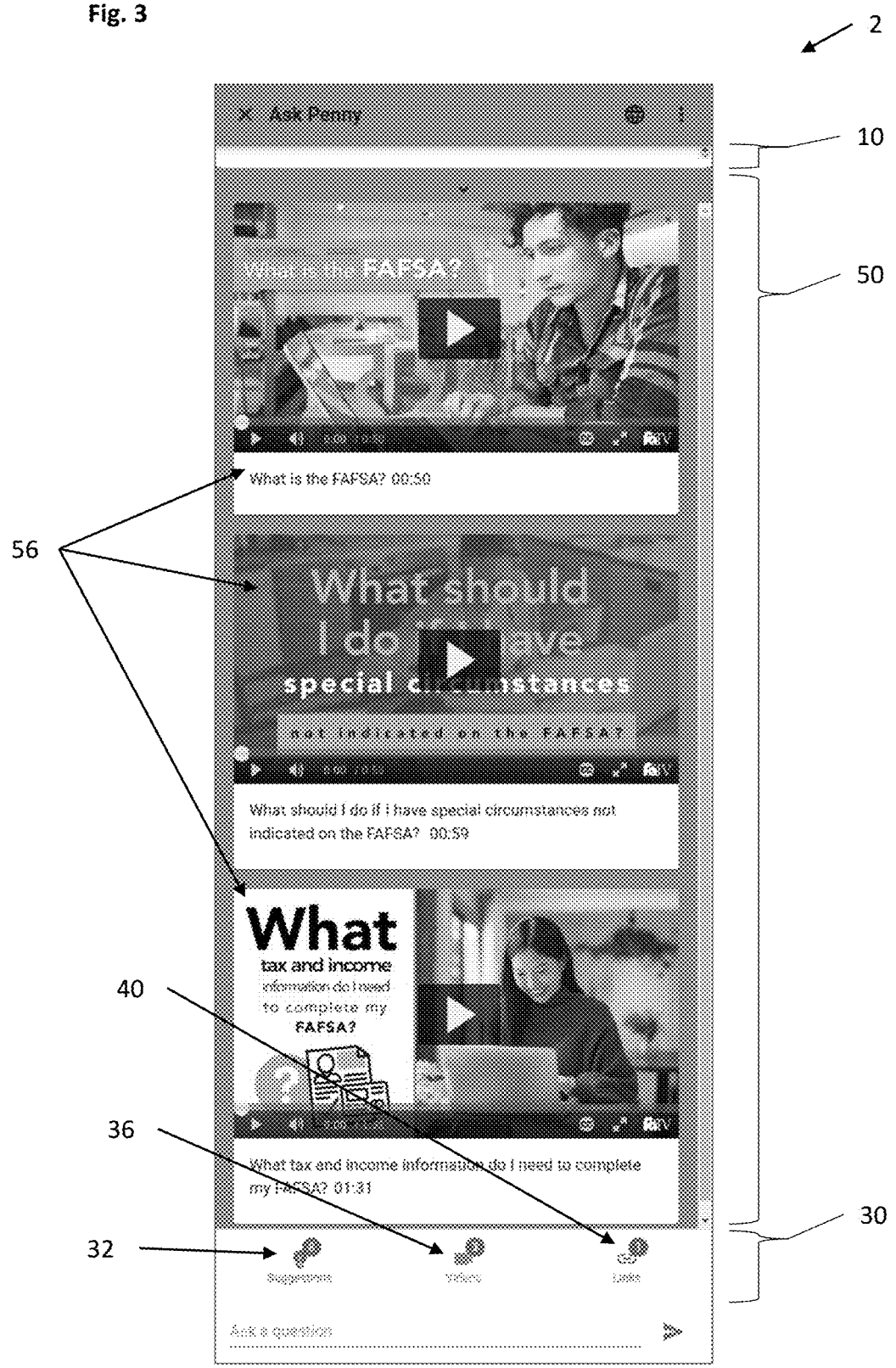

FIG. 3 is another screenshot of the example chatbot interface 2. FIG. 3 shows the chatbot interface 2 when a user has selected the suggested videos indicator 36 to display/expand the suggested content display area 50 and display suggested video items 56 in the suggested content display area 50. As shown in FIG. 3, the suggested videos 56 (e.g., a video titled "What should I do if I have special circumstances not indicated on the FAFSA?") relate to the user's first inquiry 14 (i.e., "what is the fafsa?"). The suggested videos 56 may be identified by the chatbot backend (not shown), using real-time identification, from a video library based on a keyword search of the video library using NER data and/or intent classification data extracted from a user's inquiry.

A user may select or click one of the suggested videos 56 displayed in the suggested content display area 50. When a user selects a suggested video 56, the selected suggested video 56 is played within the chatbot interface 2. Alternatively, the selected suggested video 56 may be opened outside of the chatbot interface 2 in a video content player, on a webpage in a separate browser tab, in a separate browser, or on a webpage on which the chatbot interface 2 is overlaid, embedded, or hosted.

Figure 4:
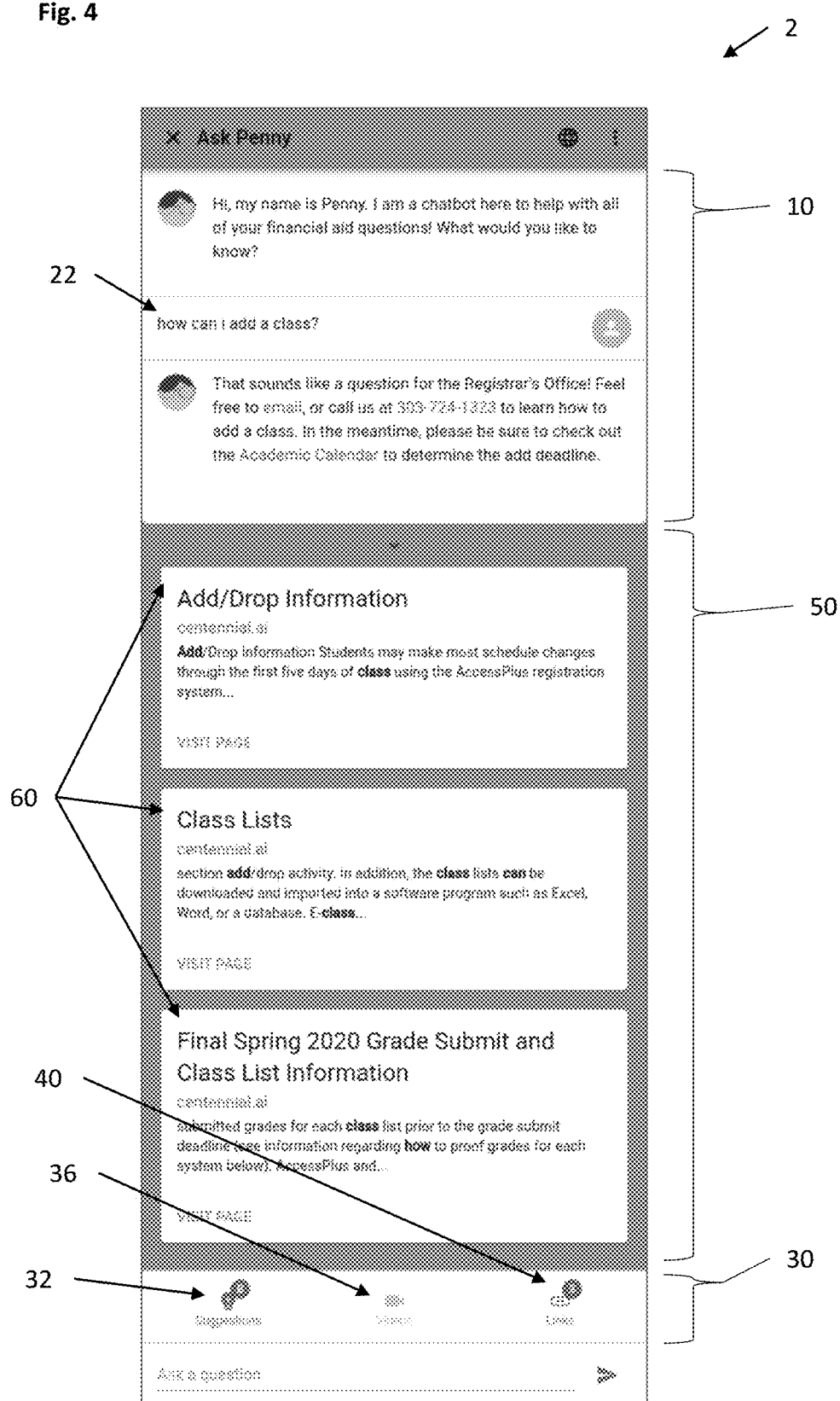

FIG. 4 is another screenshot of the example chatbot interface 2. FIG. 4 shows the chatbot interface 2 when a user has selected the suggested links indicator 40 to display/expand the suggested content display area 50 and display suggested links 60 in the suggested content display area 50. As shown in FIG. 4, the suggested links 60 (e.g., a link titled "Class Lists") relate to the user's second inquiry 22 (i.e., "how can I add a class?"). The suggested links 60 may be identified by the chatbot backend (not shown), using real-time identification, from webpages similar or related to the webpage on which the chatbot interface 2 is hosted or embedded. The suggested links 60 may be identified by the chatbot backend (not shown), using real-time identification, based on a weighted keyword search of content scraped from the similar or related webpages, NER data extracted from the scraped content, and intent classification data extracted from the scraped content, using NER data and/or intent classification data of the second inquiry 22.

A user may select or click one of the suggested links 60 displayed in the suggested content display area 50. When a user selects a suggested link 60, the website or other content associated with the selected suggested link 60 is opened on the user's device. The website or other content associated with the selected suggested link 60 may be opened within the chatbot interface 2. Alternatively, the website or content associated with the selected suggested link 60 may be opened outside of the chatbot interface 2, and a user may be directed from a current webpage to the webpage associated with the selected suggested link 60. For example, when a user selects a suggested link 60, the user may be directed to an external website, a separate browser tab, or a separate browser. In another example, when a user selects a suggested link 60, the user may be directed from a current webpage on which the chatbot interface 2 is overlaid, embedded, or hosted to another webpage associated with the selected suggested link 60 on which the chatbot interface 2 is also overlaid, embedded, or hosted. When a user selects a suggested link 60, the chatbot interface 2 may stay open, it may be collapsed or hidden, or the user may be directed to a webpage that does not support, display, or include the chatbot 2.

Figure 5:
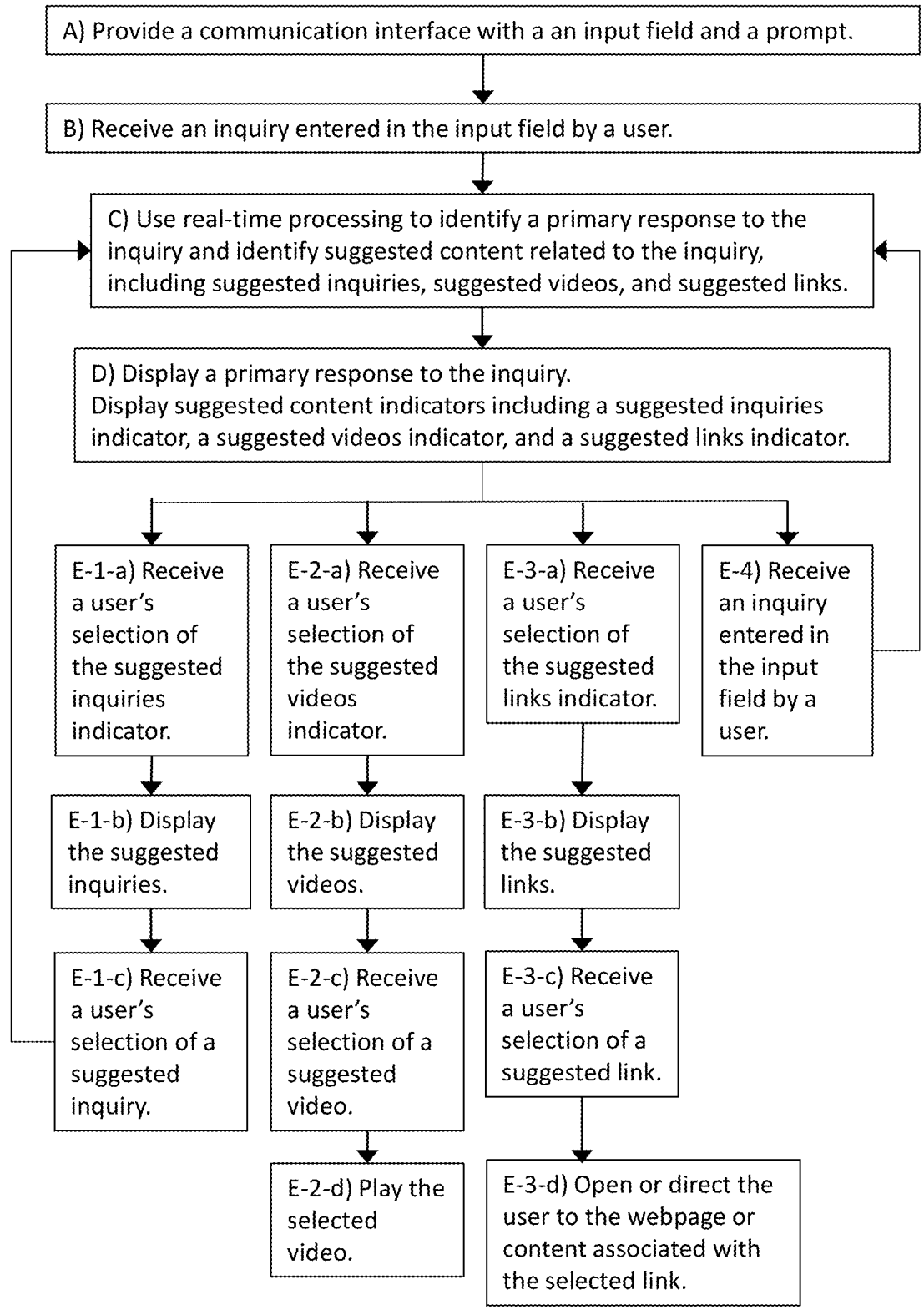
FIG. 5 is a flowchart of one embodiment of the present invention.

FIG. 5 shows a flowchart for a method and system of providing guided, predicative Q&A and suggestions for resources and content. Steps A-E of the flowchart in FIG. 5 may be performed by, or stored in a computer-readable medium of, a chatbot system, chatbot application, or other computing device(s) according to an embodiment of this invention.

In step A, the system provides a communication interface comprising an input field and a prompt. The prompt may present a user with an instruction or query related to use of the system. The input field allows a user to enter information such as an inquiry.

In step B, the system receives an inquiry entered in the input field by a user.

In step C, the system uses real-time processing to identify a primary response to the inquiry received in step B and identify suggested content related to the inquiry received in step B. The suggested content identified in step C may include suggested inquiries, suggested videos, or suggested links related to the inquiry received in step B.

In step D, the system displays in the communication interface the primary response identified in step C. Also in step D, the system displays in the communication interface suggested content indicators, including a suggested inquiries indicator, suggested videos indicator, and suggested links indicator. The suggested content indicators can indicate that suggested content of a particular type (i.e., inquiry, video, or link) was identified in step C.

In step E-1-*a*, the system receives a user's selection of the suggested inquiries indicator. In step E-1-*b*, the system displays in the communication interface the suggested inquiries identified in step C. In step E-1-*c*, the system receives a user's selection of a particular suggested inquiry displayed in the communication interface in step E-1-*b*. Then, the system performs step C using the selected suggested inquiry, the selection of which was received in step E-1-*c*. In this iteration of step C, the system uses real-time processing to identify a primary response to the suggested inquiry selected and received in step E-1-*c* and identify suggested content related to the suggested inquiry selected and received in step E-1-*c*. The system then proceeds to perform steps D and E.

In step E-2-*a*, the system receives a user's selection of the suggested videos indicator. In step E-2-*b*, the system displays in the communication interface the suggested videos identified in step C. In step E-2-*c*, the system receives a user's selection of a particular suggested video displayed in the communication interface in step E-2-*b*. In step E-2-*d*, the system plays the selected suggested video, the selection of which was received in step E-2-*c*.

In step E-3-*a*, the system receives a user's selection of the suggested links indicator. In step E-3-*b*, the system displays in the communication interface the suggested links identified in step C. In step E-3-*c*, the system receives a user's selection of a particular suggested link displayed in the communication interface in step E-3-*b*. In step E-3-*d*, the system opens or directs the user to a webpage or content associated with the selected suggested link, the selection of which was received in step E-3-*c*.

In step B, the system receives an inquiry entered in the input field by a user. Then, the system performs step C using the inquiry received in step E-4. In this iteration of step C, the system uses real-time processing to identify a primary response to the inquiry received in step E-4 and identify suggested content related to the inquiry received in step E-4. The system then proceeds to perform steps D and E.

The system performs steps C and D as real-time steps, with no noticeable delay, following step B, E-1-*c*, or E-4.

Depending on a user's actions, the following steps may be performed after step E-1-*b*: step E-1-*c*, step E-2-*a*, step E-3-*a*, or step E-4. Depending on a user's actions, the following steps may be performed after step E-2-*b*: step E-1-*a*, step E-2-*c*, step E-3-*a*, or step E-4. Depending on a user's actions, the following steps may be performed after step E-2-*d*: step E-1-*a*, step E-2-*c*, step E-3-*a*, or step E-4. Depending on a user's actions, the following steps may be performed after step E-3-*b*: step E-1-*a*, step E-2-*a*, step E-3-*c*, or step E-4. Depending on a user's actions, the following steps may be performed after step E-3-*d*: step E-1-*a*, step E-2-*a*, step E-3-*c*, or step E-4.

Figure 6:
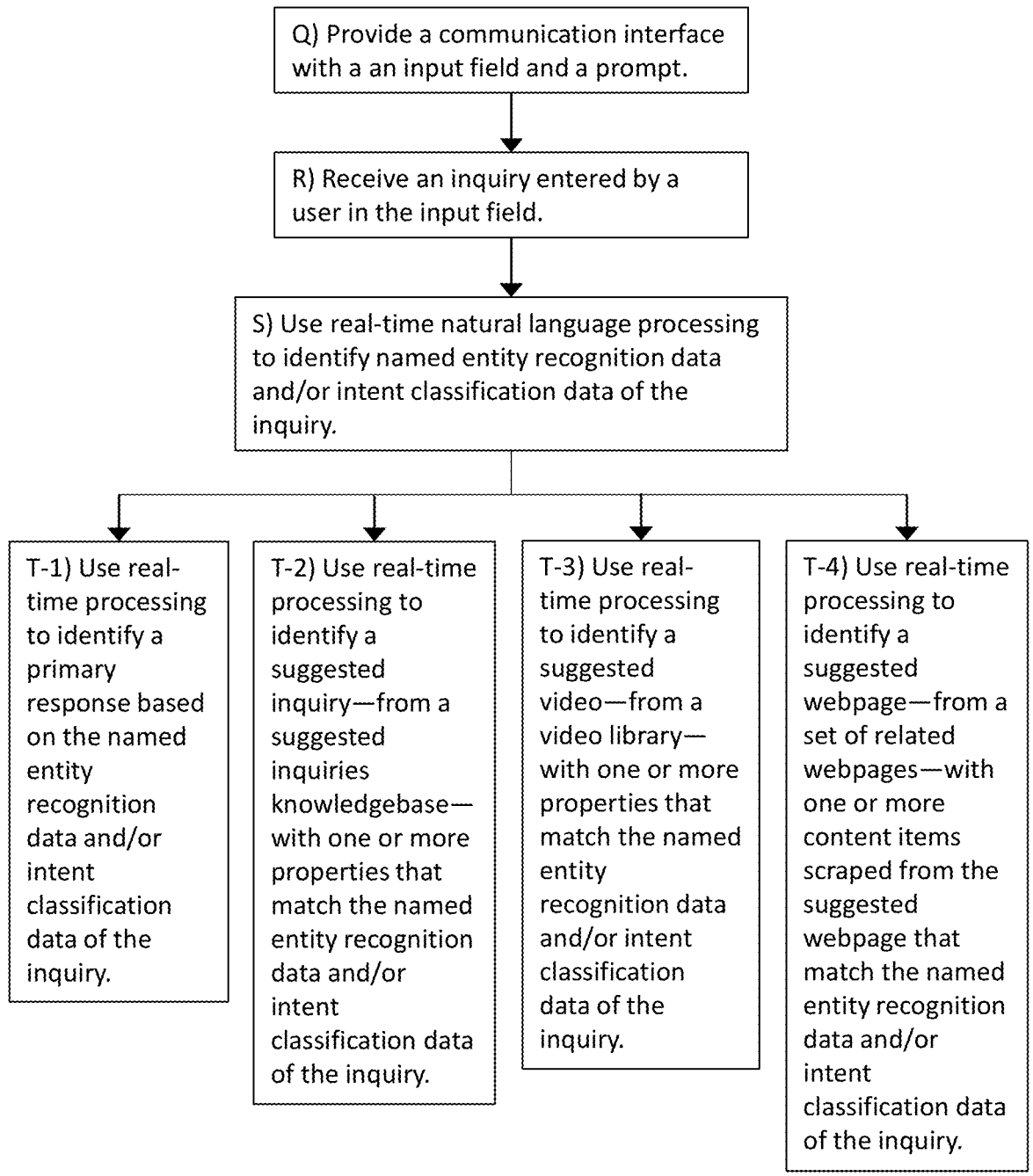
FIG. 6 is a flowchart of one embodiment of the present invention.

FIG. 6 shows a flowchart for a method and system of providing guided, predicative Q&A and suggestions for resources and content. Steps Q-T of the flowchart in FIG. 6 may be performed by, or stored in a computer-readable medium of, a chatbot system, chatbot application, or other computing device(s) according to an embodiment of this invention.

In step Q the system provides a communication interface comprising an input field and a prompt. In step R, the system receives an inquiry entered in the input field by a user. In step S, the system uses real-time natural language processing to identify NER data and/or intent classification data of the inquiry received in step R.

In step T-1, the system uses real-time processing to identify a primary response to the inquiry processed in step S based on the NER data and/or intent classification data of the inquiry. In step T-2, the system uses real-time processing to identify a suggested inquiry with one or more properties that match the NER data and/or intent classification data of the inquiry processed in step S. The suggested inquiry identified in step T-2 may be identified from a suggested inquiries knowledgebase. In step T-3, the system uses real-time processing to identify a suggested video with one or more properties that match the NER data and/or intent classification data of the inquiry processed in step S. The suggested video identified in step T-3 may be identified from a video library. In step T-4, the system uses real-time processing to identify a suggested webpage with one or more content items scraped from the suggested webpage that match the NER data and/or intent classification data of the inquiry processed in step S. The suggested webpage identified in step T-4 may be identified from a set of related webpages.

The steps T-2, T-3, and T-4 may be performed to identify one or more suggested inquiries, suggested videos, or suggested webpages, respectively. The system performs steps T-1, T-2, T-3, and T-4 substantially simultaneously.

In one embodiment, the method or system of the invention can be implemented using a website, web application, web portal, mobile application, native application, rich messaging service (e.g., RCS), or other tool or service capable of implementing the functionalities or features described. In one embodiment, the method or system of the invention can be implemented using an application, such as a third-party application, via API (e.g., REST, GraphQL). In one embodiment, the method or system includes a communication interface, and the communication interface can be displayed on a user device, such as a user's computer, mobile phone, tablet, or other user device, and a user may interact with the communication interface using a user device.

In one embodiment, the method or system of the present invention can be implemented using one or more back-end components and/or one or more front-end components. A front-end component can include one or more front-end clients or user devices. A back-end component can include one or more web servers, application servers, or databases. A back-end component can include one or more cloud services, natural language processor components, NER processing components, intent classification processing components, sentiment analysis processing components, search platform components, database components, content management systems, cache and session management systems, or inter-process communication components.

Figure 7:
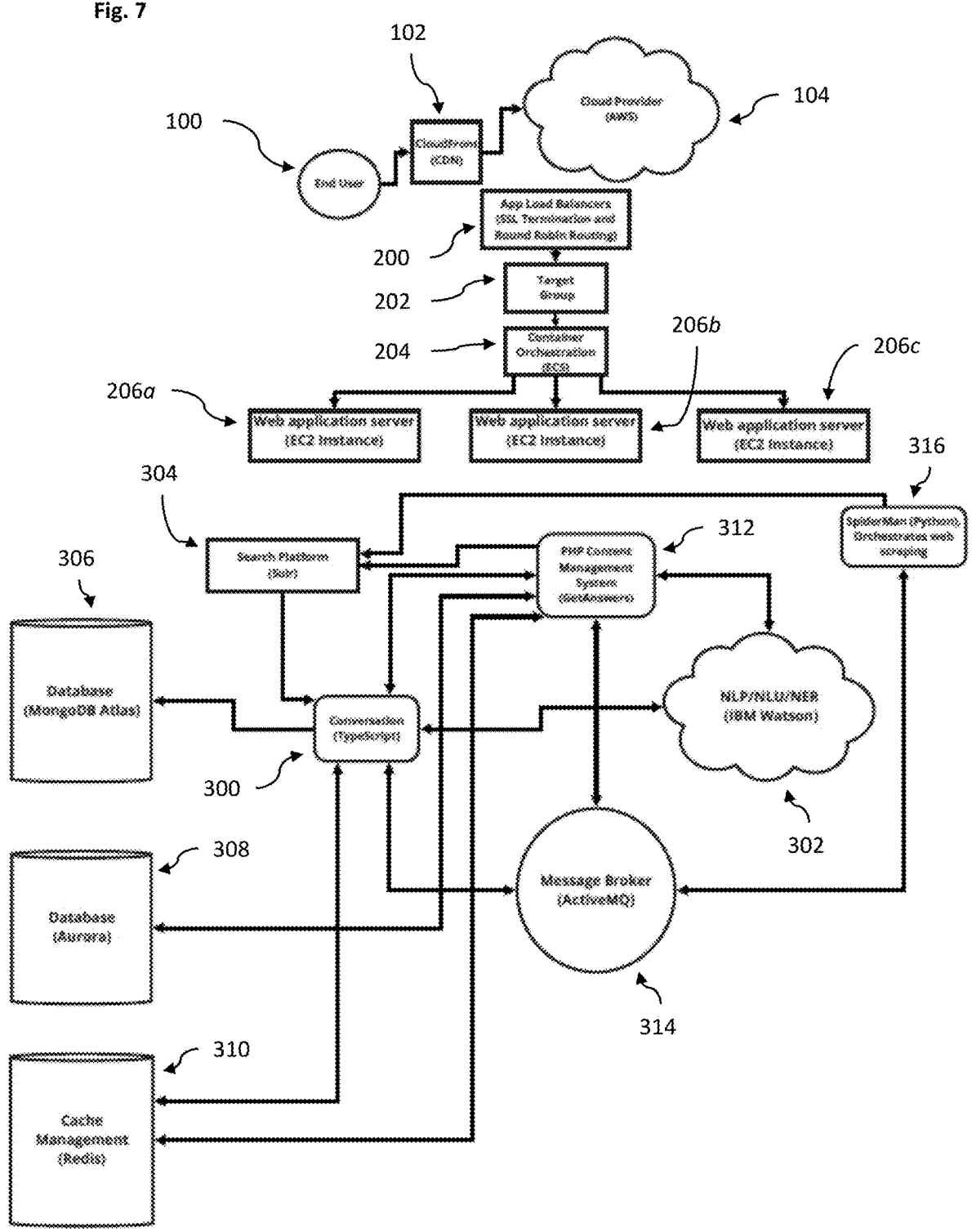
FIG. 7 is a system architecture of one embodiment of the present invention.

FIG. 7 shows an example system architecture of one embodiment. The system architecture of FIG. 7 may implement any feature or functionality described herein. The back-end components of the system shown in FIG. 7 are example components, and an embodiment of the system may include any combination of one or more of such components based on the desired features or functionality described herein, as would be understood by a person of skill.

In one embodiment, an implementation of the present invention (e.g., a web application) can be hosted on a cloud platform, for example, to provide flexibility, reliability, and security. The cloud platform may be AWS, Google, or Azure. An end user may be connected to a cloud provider via a content delivery network (CDN), such as CloudFront. For example, FIG. 7 shows one embodiment of a system architecture where an implementation of a chatbot is hosted on a cloud provider platform (AWS) 104 that is provided to an end user 100, and accessed by the end user 100, via CloudFront (content delivery network or CDN) 102.

In one embodiment, an implementation of the present invention may utilize load balancing. For example, FIG. 7 shows one embodiment of a system that uses an application load balancer (SSL termination and round robin routing) 200, which may distribute traffic from users to a plurality of servers in a target group, such as target group 202. An application load balancer 200 can maintain high availability and scale. FIG. 7 also shows, for example, one embodiment of the system that uses a target group 202, which may maintain a list of healthy application servers to which traffic can be distributed. FIG. 7 also shows, for example, one embodiment of the system that uses a container orchestration (ECS) 204. The container orchestration platform 204, such as ECS or Kubernetes, may manage the deployment and monitor the status of a plurality of self-contained applications across a plurality of servers, such as web application servers 206a-206c. FIG. 7 also shows, for example, one embodiment of the system that uses web application servers (EC2 instances) 206a-206c, or virtual private servers, which may use a container technology such as Docker to host web applications.

In one embodiment, an implementation of the invention may utilize a conversation server. A conversation server may, for example, handle user input, perform preprocessing or sanitization, call to a processing platform (e.g., a language processing platform), and/or perform other tasks related to the features and functions described herein. A conversation server may be connected to, in communication with, or functionally associated with one or more other system components. For example, FIG. 7 shows one embodiment of a system architecture that uses a conversation server or engine 300, using a language such as TypeScript.

In one embodiment, the invention involves processing of information, such as processing of a user's entry (e.g., inquiry), a response to a user's entry, a suggested inquiry, a suggested video or data associated with a suggested video, or a suggested link or data associated with a webpage or content of a suggested link. In one embodiment, processing of information can include natural language processing, NER processing, intent classification processing, sentiment analysis processing, keyword recognition, or other methods of processing syntax or semantics. In one embodiment, processing of information may utilize machine learning or an artificial-intelligence platform. For example, processing of information may utilize platforms such as IBM Watson, Amazon Lex, Google Dialogflow, and Microsoft Luis, among others. For example, a platform such as IBM Watson may be utilized to perform natural language processing of a user's textual inquiry, and this processing may extract intent classification data and NER data that can be used to search for and identify suggested content related to the user's inquiry. A processing platform (e.g., IBM Watson) may be connected to, in communication with, or functionally associated with one or more other system components. For example, FIG. 7 shows one embodiment of a system architecture that uses an NLP/NLU/NER processor (IBM Watson) 302, which can perform natural language processing, natural understanding processing, and named entity recognition.

In one embodiment, the invention involves searching and/or indexing, such as searching to identify a response or suggested content related to a user's inquiry. In one embodiment, a search engine or search platform may be utilized to perform searching and/or indexing. For example, searching and/or indexing may utilize platforms such as Apache Solr, Elasticsearch, Algolia, or similar platforms. Searching may utilize processed data extracted from, for example, a user's inquiry and/or a suggested content item. A search platform (e.g., Apache Solr) may be connected to, in communication with, or functionally associated with one or more other system components, such as a processing platform (e.g., IBM Watson). For example, FIG. 7 shows one embodiment of a system architecture that uses a search platform (Solr) 304.

In one embodiment, the invention involves a database or similar storage component. In one embodiment, a database is used for storing possible responses, possible suggested content, or information related to possible suggested responses or content. In one embodiment, the database may be a relational database. In one embodiment, the database may be a non-relational, such as NoSQL, database. In one embodiment, the invention may utilize AWS Aurora, MySQL, MariaDB, PostgreSQL, MongoDB, Apache Cassandra, or similar databases. A database (e.g., AWS Aurora) may be connected to, in communication with, or functionally associated with one or more other system components, such as a search platform (e.g., Apache Solr) and/or a processing platform (e.g., IBM Watson). For example, FIG. 7 shows one embodiment of a system architecture that uses a database (MongoDB Atlas) 306 and a database (Aurora) 308.

In one embodiment, the invention utilizes a cache and/or session management component. For example, the invention may utilize Redis, Memcached, or similar cache components. A cache and/or session management component (e.g., Redis) may be connected to, in communication with, or functionally associated with one or more other system components. For example, FIG. 7 shows one embodiment of a system architecture that uses a cache management (Redis) 310.

In one embodiment, the invention utilizes a content management system. For example, a content management system may be utilized to create or manage content on a website. For example, a content management system may be utilized to search or index information from a website to a search engine or database. In one embodiment, the invention may utilize Drupal, Wordpress, KeystoneJS, or similar content management systems. A content management system (e.g., Drupal) may be connected to, in communication with, or functionally associated with one or more other system components, such as a search platform (e.g., Apache Solr), database (e.g., AWS Aurora), and/or a processing platform (e.g., IBM Watson). For example, FIG. 7 shows one embodiment of a system architecture that uses a PHP content management system (GetAnswers) 312.

In one embodiment, the invention utilizes an inter-process communication component, such as a message broker. For example, the invention may utilize AWS MQ (Apache ActiveMQ), Kafka, Redis, RabbitMQ, or similar message brokers. An inter-process communication component (e.g., AWS MQ) may be connected to, in communication with, or functionally associated with one or more other system components. For example, FIG. 7 shows one embodiment of a system architecture that uses a message broker (ActiveMQ) 314.

In one embodiment, the invention utilizes a front-end client. For example, the invention may utilize React, Angular, Vue, or similar front-end clients. A front-end client (e.g., React) may be connected to, in communication with, or functionally associated with one or more other system components. For example, in FIG. 7, a front-end client may be associated with the End User 100.

In one embodiment, the invention utilizes a web scraping or web crawling component, such as SpiderMan. For example, a web scraping or web crawling component may be used to identify suggested links, suggested videos, or other suggested content. For example, a web scraping component may be used to scrape data from a webpage, or other source, to be used by a search platform or a machine learning and processing platform. For example, FIG. 7 shows one embodiment of a system architecture that uses a SpiderMan (Python) web scraping component 316.

The connections shown in FIG. 7 are examples of how an embodiment's components may be connected. In FIG. 7, for example, there are connections between the conversation server 300 and the NLP/NLU/NER processor 302, the search platform 304, the database 306, the cache management 310, the PHP content management system 312, and the message broker 314. In FIG. 7, for example, there are also connections between the PHP content management system 312 and the NLP/NLU/NER processor 302, the search platform 304, the database 308, the cache management 310, and the message broker 314. In FIG. 7, for example, there are also connections between the SpiderMan web scraping component 316 and both the search platform 304 and message broker 314. Another embodiment may include one or more other connections between these components or another combination of components, for example, to provide the features or functionality described herein, as would be understood by a person of skill.

In one embodiment, the invention is implemented as at least one computer-readable medium. The computer-readable medium may store information related to one or more aspects of the system or method of the present invention. For example, the computer-readable medium may store instructions for implementing one or more steps of a method of the invention on one or more electronic devices or computer devices. Instructions or information stored by the computer-readable medium may be read and/or executed by computer devices or other related devices to perform one or more steps of a method disclosed herein. A computer-readable medium can include, for example, one or more memories of one or more servers, databases, or the like.

In one embodiment, the method or system of the invention can be provided, maintained, operated, or implemented by a system provider. A system provider can provide, maintain, operate, or implement the method or system for a client. For example, a system provider may setup, configure, customize, install, upload, and/or embed one or more aspects of the method or system to be provided on, or as part of, a client's website, web application, or mobile web application. In one embodiment, the system provider configures and provides the chatbot system and method such that a communication interface of the system and method is provided on a client's website and features of the chatbot system and method are configured specifically for the client.

In one example, a knowledgebase of possible responses or a knowledgebase of possible suggested inquiries may include possible responses or possible suggested inquiries related to the client, the client's website, or a good or service of the client. The possible responses or possible suggested inquiries, or data associated therewith, may be provided and/or customized by the system provider, client, or both. For example, the system provider may provide a knowledgebase with template, possible responses or template, possible suggested inquiries, and the client may modify or add to the possible responses or possible suggested inquiries.

In one example, a video library or database may include suggested videos, images, or similar content related to the client, the client's website, or a good or service of the client. The items in the video library, or the data associated therewith, may be provided and/or customized by the system provider, client, or both. For example, the system provider may provide a video library with an initial set of videos or videos from certain resources, and the client may modify or add to the videos in the library.

In one example, a library or database may include possible suggested links or possible webpages from which suggested links may be selected, and the possible suggested links, webpages, or content of the webpages can be related to the client, the client's website, or a good or service of the client. In one example, the system or method may search or select from links or webpages related to the client, the client's website, or a good or service of the client. The library or source of possible suggested links or webpages may be provided and/or customized by the system provider, client, or both. For example, the system provider may provide a chatbot interface on a client's website, and suggested links or webpages identified by the system may be for webpages associated with the client's website.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated.

The invention claimed is:

1. A method for providing a Q&A interface comprising:
providing a communication interface comprising an input field;
receiving an entry through the input field by a user;
identifying a response to the entry, wherein the response is identified based on a correlation between data associated with the entry and a property of the response;
identifying a first suggested item selected from the group consisting of a suggested inquiry, a suggested media content item, and a suggested link item;
identifying a second suggested item selected from the group consisting of a suggested inquiry, a suggested media content item, and a suggested link item, wherein the second suggested item is a different type of suggested item than the first suggested item;
displaying the response in the communication interface;
displaying a first suggested item indicator in the communication interface, wherein the first suggested item indicator is associated with the first suggested item; and
displaying a second suggested item indicator in the communication interface, wherein the second suggested item indicator is associated with the second suggested item.

2. The method of claim 1, wherein the first suggested item is identified based on a correlation between the entry and a property of the first suggested item, and wherein the second suggested item is identified based on a correlation between the entry and a property of the second suggested item.

3. The method of claim 1, wherein the communication interface is configured to display the first suggested item upon selection of the first suggested item indicator and configured to display the second suggested item upon selection of the second suggested item indicator.

4. The method of claim 1, wherein the first suggested item is a suggested inquiry and the second suggested item is a suggested media content item.

5. The method of claim 1, wherein the first suggested item is a suggested inquiry and the second suggested item is a suggested link item.

6. The method of claim 1, wherein the first suggested item is a suggested media content item and the second suggested item is a suggested link item.

7. The method of claim 1, wherein identifying and displaying the response, identifying the first and second suggested items, and displaying the first and second suggested item indicators are performed as real-time steps following receiving the entry.

8. The method of claim 7, wherein the real-time steps are performed by a chatbot.

9. The method of claim 7, further comprising:
receiving a second entry through the input field by a user after performance of the real-time steps of claim 7;
identifying a second response to the second entry, wherein the second response is identified based on a correlation between data associated with the second entry and a property of the second response;
identifying a third suggested item selected from the group consisting of a suggested inquiry, a suggested media content item, and a suggested link item;
identifying a fourth suggested item selected from the group consisting of a suggested inquiry, a suggested media content item, and a suggested link item, wherein the fourth suggested item is a different type of suggested item than the third suggested item;
displaying the second response in the communication interface;
associating the first suggested item indicator with the third suggested item; and
associating the second suggested item indicator with the fourth suggested item,
wherein identifying and displaying the second response, identifying the third and fourth suggested items, associating the first suggested item indicator with the third suggested item, and associating the second suggested item indicator with the fourth suggested item are performed as real-time steps following receiving the second entry.

10. The method of claim 1, wherein the communication interface comprises a conversation field configured to display the entry and the response, and wherein the communication interface comprises a suggested content indicator area configured to display the first and second suggested item indicators.

11. The method of claim 10, wherein the communication interface comprises a suggested content display area configured to display the first suggested item upon selection of the first suggested item indicator or the second suggested item upon selection of the second suggested item indicator.

12. The method of claim 1, further comprising receiving a user's selection of the first suggested item or second suggested item.

13. A non-transitory computer-readable medium having instructions stored thereon
that when executed by a computing system perform a method comprising:
providing a communication interface comprising an input field;
receiving an entry through the input field by a user;
identifying a response to the entry, wherein the response is identified based on a correlation between data associated with the entry and a property of the response;
identifying a first suggested item selected from the group consisting of a suggested inquiry, a suggested media content item, and a suggested link item;
identifying a second suggested item selected from the group consisting of a suggested inquiry, a suggested media content item, and a suggested link item, wherein the second suggested item is a different type of suggested item than the first suggested item;

displaying the response in the communication interface;

displaying a first suggested item indicator in the communication interface, wherein the first suggested item indicator is associated with the first suggested item; and displaying a second suggested item indicator in the communication interface, wherein the second suggested item indicator is associated with the second suggested item.

14. The non-transitory computer-readable medium of claim 13, wherein the first suggested item is a suggested inquiry and the second suggested item is a suggested media content item or a suggested link item.

15. The non-transitory computer-readable medium of claim 13, wherein identifying and displaying the response, identifying the first and second suggested items, and displaying the first and second suggested item indicators are performed as real-time steps following receiving the entry.

16. The non-transitory computer-readable medium of claim 15, wherein the real-time steps are performed by a chatbot.

17. The non-transitory computer-readable medium of claim 13, wherein the communication interface comprises a conversation field configured to display the entry and the response, and wherein the communication interface comprises a suggested content indicator area configured to display the first and second suggested content indicators.

18. A system comprising:

a communication interface, wherein the communication interface is displayed on a website and configured to receive a user entry;

a suggested inquiries knowledgebase comprising a set of possible suggested inquiries; and a server system configured to:

identify a response based on a correlation between data associated with the user entry and a property of the response, identify a first suggested item selected from the group consisting of a suggested inquiry, a suggested media content item, and a suggested link item, and identify a second suggested item selected from the group consisting of a suggested inquiry, a suggested media content item, and a suggested link item, wherein the second suggested item is a different type of suggested item than the first suggested item;

wherein the communication interface is configured to display the response, display a first suggested item indicator associated with the first suggested item, and display a second suggested item indicator associated with the second suggested item.

19. The system of claim 18, wherein the first suggested item is a suggested inquiry and the second suggested item is a suggested media content item or a suggested link item.

20. The system of claim 18, wherein the communication interface comprises a conversation field configured to display the user entry and the response, and wherein the communication interface comprises a suggested content indicator area configured to display the first and second suggested item indicators.

* * * * *